INVENTOR
ROBERT E. MALM

BY Hurvitz + Rose

ATTORNEYS

FIG. 3

| TIME SLOT | 1 | 2 | 3 | 4 | 5 | ∘ ∘ ∘ ∘ ∘ | N-2 | N-1 | N |
|---|---|---|---|---|---|---|---|---|---|
| FREQUENCY | $\frac{W}{N}$ | $2\frac{W}{N}$ | $3\frac{W}{N}$ | $4\frac{W}{N}$ | $5\frac{W}{N}$ | ∘ ∘ ∘ ∘ ∘ | $(N-2)\frac{W}{N}$ | $(N-1)\frac{W}{N}$ | $(N)\frac{W}{N}$ |
| SINE AMPLITUDE | $u_{1r}$ | $u_{2r}$ | $u_{3r}$ | $u_{4r}$ | $u_{5r}$ | ∘ ∘ ∘ ∘ ∘ | $u_{(N-2)r}$ | $u_{(N-1)r}$ | $u_{Nr}$ |
| COSINE AMPLITUDE | $u_{1i}$ | $u_{2i}$ | $u_{3i}$ | $u_{4i}$ | $u_{5i}$ | ∘ ∘ ∘ ∘ ∘ | $u_{(N-2)i}$ | $u_{(N-1)i}$ | $u_{Ni}$ |

FIG. 4a

| | IMFORMATION BIT | |
|---|---|---|
| | 0 | 1 |
| $u_{nr}$ | .000---0 | .111---1 |
| $u_{ni}$ | .000---0 | .000---0 |

FIG. 4b

| | IMFORMATION BIT | |
|---|---|---|
| | 0 | 1 |
| $u_{nr}$ | -.111---1 | .11---1 |
| $u_{ni}$ | .000---0 | .000---0 |

FIG. 4c

| | IMFORMATION BIT | |
|---|---|---|
| | 0 | 1 |
| $u_{(2n)r}$ | .000---0 | .111---1 |
| $u_{(2n-1)}$ | .111---1 | .000---0 |
| $u_{(2n)i}$ | .000---0 | .000---0 |
| $u_{(2n-1)i}$ | .000---0 | .000---0 |

FIG. 4d

| | IMFORMATION BIT | | | |
|---|---|---|---|---|
| | 00 | 01 | 10 | 11 |
| $u_{nr}$ | -.111---1 | .111---1 | -.111---1 | .111---1 |
| $u_{ni}$ | -.111---1 | -.111---1 | .111---1 | .111---1 |

INVENTOR
ROBERT E. MALM

BY Hurvitz & Rose
ATTORNEYS

INVENTOR
ROBERT E. MALM

BY *Hurvitz & Rose*

ATTORNEYS

INVENTOR
ROBERT E. MALM
BY
Hurvitz & Rose
ATTORNEYS

INVENTOR
ROBERT E. MALM

BY Hurvitz & Rose

ATTORNEYS

INVENTOR
ROBERT E. MALM

BY Hurvitz & Rose
ATTORNEYS

FIG. 10a

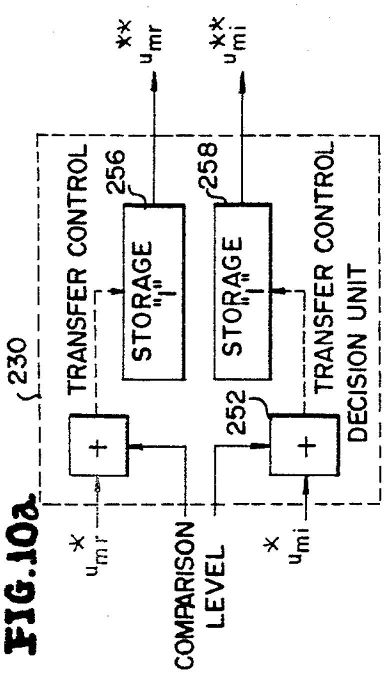

* CORRUPTED BY NOISE
** RECONSTRUCTED

| TYPE OF MODULATION | COMPARISON LEVEL | TRANSFER RULES SUM POSITIVE | TRANSFER RULES SUM NEGATIVE |
|---|---|---|---|
| ON-OFF | -.0111---1 | TRANSFER | NO TRANSFER |
| 2-LEVEL PSK | .0000---0 | TRANSFER | TRANSFER WITH NEGATIVE SIGN |
| FSK* | $\begin{cases} -u_{(m-1)r} \\ -u_{(m-1)i} \end{cases}$ | DELAY ONE SLOT AND TRANSFER | TRANSFER |
| 4-LEVEL PSK | .0000---0 | TRANSFER | TRANSFER WITH NEGATIVE SIGN |

*COMPARISON DURING EVEN-NUMBERED TIME SLOTS ONLY

FIG. 10b

FIG. 11

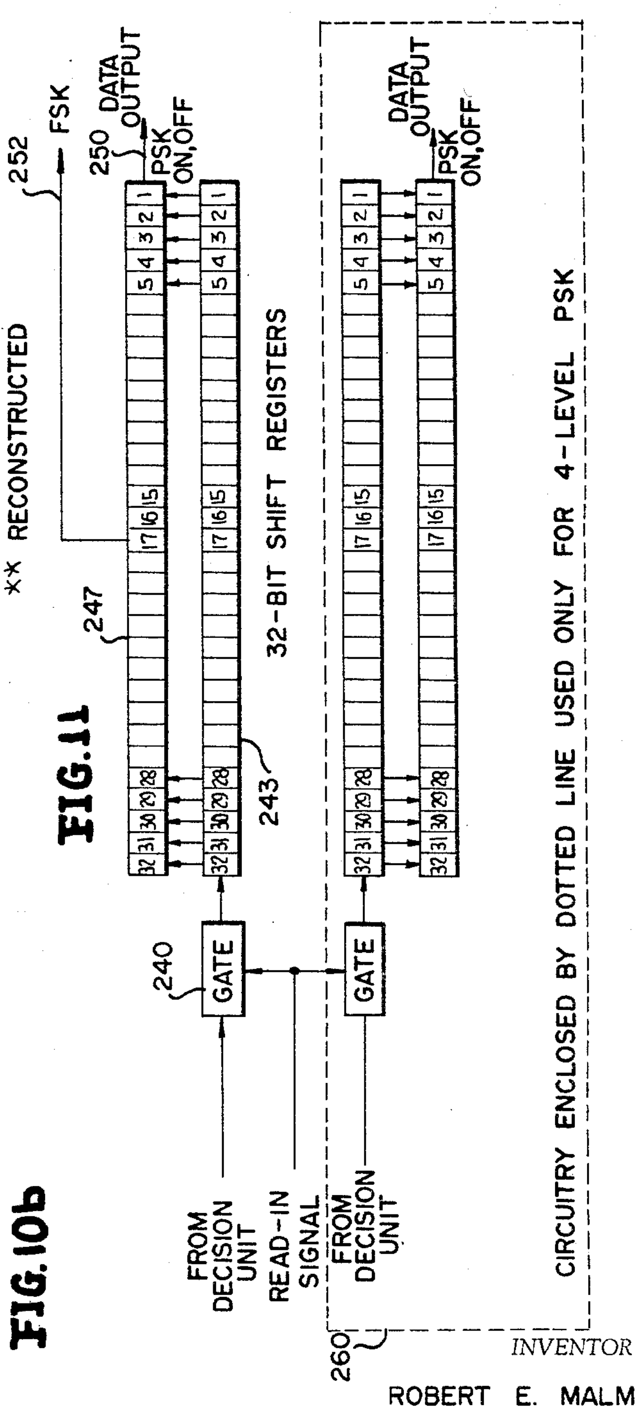

INVENTOR
ROBERT E. MALM
BY Hurvitz & Rose
ATTORNEYS

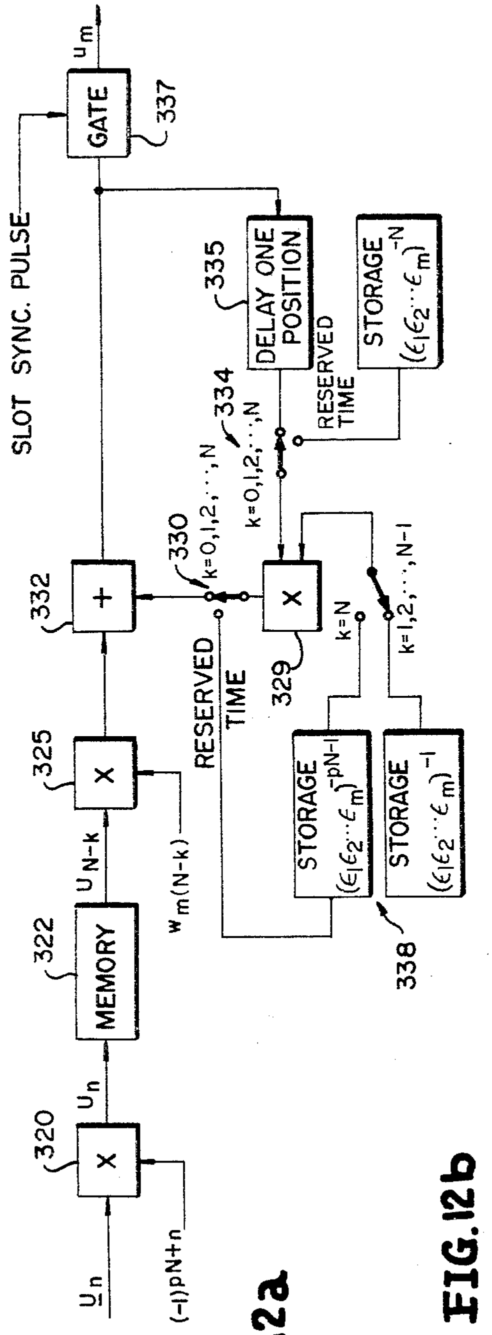

FIG. 12a FIG. 12b

| SLOT | m | | | | | |
|---|---|---|---|---|---|---|
| POSITION(k) | 0 | 1 | 2 | 3 | 4 | RESERVED |
| OUTPUT FROM STORAGE | | $(\epsilon_1\epsilon_2\cdots\epsilon_m)^{-1}$ | $(\epsilon_1\epsilon_2\cdots\epsilon_m)^{-1}$ | $(\epsilon_1\epsilon_2\cdots\epsilon_m)^{-1}$ | $(\epsilon_1\epsilon_2\cdots\epsilon_m)^{-pN-1}$ | TIME RESERVED FOR CIRCULATION OF $(\epsilon_1\epsilon_2\cdots\epsilon_m)^{-(p+1)N-1}$ FOR USE IN NEXT FRAME |
| WEIGHTING FUNCTION | $w_{m4}$ | $w_{m3}$ | $w_{m2}$ | $w_{m1}$ | | |
| MEMORY OUTPUT | $U_4$ | $U_3$ | $U_2$ | $U_1$ | | |
| MULTIPLIER OUTPUT | $w_{m4}U_4$ | $w_{m3}U_3$ | $w_{m2}U_2$ | $w_{m1}U_1$ | | |
| AFTER ONE CIRCULATION | | $w_{m4}U_4(\epsilon_1\epsilon_2\cdots\epsilon_m)^{-1}$ | $w_{m3}U_3(\epsilon_1\epsilon_2\cdots\epsilon_m)^{-1}$ | $w_{m2}U_2(\epsilon_1\epsilon_2\cdots\epsilon_m)^{-1}$ | $w_{m1}U_1(\epsilon_1\epsilon_2\cdots\epsilon_m)^{-pN-1}$ | |
| AFTER TWO CIRCULATIONS | | | $w_{m4}U_4(\epsilon_1\epsilon_2\cdots\epsilon_m)^{-2}$ | $w_{m3}U_3(\epsilon_1\epsilon_2\cdots\epsilon_m)^{-2}$ | $w_{m2}U_2(\epsilon_1\epsilon_2\cdots\epsilon_m)^{-pN-2}$ | |
| AFTER THREE CIRCULATIONS | | | | $w_{m4}U_4(\epsilon_1\epsilon_2\cdots\epsilon_m)^{-3}$ | $w_{m3}U_3(\epsilon_1\epsilon_2\cdots\epsilon_m)^{-pN-3}$ | |
| AFTER FOUR CIRCULATIONS | | | | | $w_{m4}U_4(\epsilon_1\epsilon_2\cdots\epsilon_m)^{-pN-4}$ | |
| $u_m$ | | | | | $\sum_{K=1}^{4} w_{mK}U_K(\epsilon_1\epsilon_2\cdots\epsilon_m)^{-pN-K}$ | |

INVENTOR
ROBERT E. MALM

BY Hurvitz & Rose
ATTORNEYS

INVENTOR
ROBERT E. MALM
BY Hurvitz & Rose
ATTORNEYS

United States Patent Office 3,435,147
Patented Mar. 25, 1969

3,435,147

ADAPTIVE DATA MODEM WHEREBY DIGITAL DATA IS ENCODED IN TIME DIVISION FORMAT AND CONVERTED TO FREQUENCY DIVISION

Robert E. Malm, Bethesda, Md., assignor to Page Communications Engineers, Inc., Washington, D.C., a corporation of Delaware Filed Feb. 28, 1966, Ser. No. 530,277
Int. Cl. H04j *1/00*
U.S. Cl. 179—15 16 Claims

ABSTRACT OF THE DISCLOSURE

A data modem in which, at the transmitting terminal, input information is modulated in a time division format in which the information is converted to digital sequences of amplitude values of the sine and cosine components of the output signals to be generated, the latter sequences digitally processed in sequential fashion for conversion to a sequential digital frequency division format in which the digital sequences are transformed to sequences representative of amplitude samples of quadrature-related components of the output signals to be generated, and the sequential digital frequency division format containing the amplitude sample-representative sequences then converted to analog band-limited output signals of frequency-division multiplexed configuration. At the receiving terminal, this operational process is effectively reversed to obtain the original input information.

The present invention relates generally to data modems and more particularly to an improved data modem which is applicable to frequency-division multiplex systems of information transmission and which can be adapted to its environment to provide operational flexibility with other terminal equipments.

The invention will be specifically described in relation to high frequency and wireline applications, but it is to be understood that these are merely examples and that the concepts and principles of the invention as set forth herein are equally applicable to all modem applications irrespective of type of transmission channel or medium.

In the past, teletype data has constituted the vast majority of digital data transmissions over wireline and high frequency communication media. More recently, however, increased use of computers and significant advances in encoded speech transmission systems (vocoders) have resulted in a need for greater data circuit capacities than those previously required. This, in turn, has resulted in an art-directed effort to devise new modulation techniques by which more efficient use of existing facilities can be had. Since it is presently deemed most desirable to transmit data over existing wireline and high frequency facilities, the maximum effort has been channeled toward the provision of terminal modulation and demodulation equipments at transmitting and receiving stations by which the specific type of data may be transmitted over a particular medium, taking into account the peculiar channel characteristics of the specific transmission medium under consideration. It will be apparent that a large number of equipments have been developed and are presently available, each for use in transmitting a specific type of data, these equipments differing in modulation technique, suitability for use with each particular transmission medium, performance, and so forth. However, little consideration have been given toward the achievement of compatibility between the large number of systems developed.

Accordingly, it is a broad object of the present invention to provide an improved data modem which can be adapted to its environment and which is therefore compatible with existing systems and flexible in its applicability to new systems that may be subsequently developed.

Existing wireline and high frequency transmission facilities have been designed primarily for voice applications. Hence, the bandwidth of the channels associated with these facilities is that which will provide acceptable voice fidelity. Digital data transmission has required appropriate adjustment in accordance with these considerations. In general, digital data rates extend from approximately 50 to 2400 bits per second, and higher if feasible consistent with a particular data format and channel characteristic. The data transmissions of interest may be divided into three specific categories or areas, viz, teletype, vocoder and computer.

Teletype data is normally frequency multiplexed to provide as many as twenty-four channels in a 3 kc. voice channel. Because of certain teletype machine characteristics band distortion is a factor critical to accurate reproduction of transmitted information, and therefore the highest permissible distortion is usually specified to be on the order of 5 percent to 15 percent. In some situations, there exists an encrypting requirement, imposing additional restrictions with respect to signal regeneration and retiming.

Computer data transmission usually requires an exact reproduction of the information applied to the transmission system input at the system output. Consequently, it is often necessary to employ error detection and request for repeat techniques so that the input data applied to the receiving computer is substantially error free. In such systems, the error rate is of little significance except as it may affect the overall rate at which data is transmitted. The latter rate is referred to as "thruput" and is the measure of the efficiency of the computer data transmission system. For this category of data transmission, rates of 600, 1200 and 2400 bits per second are most commonly utilized.

In the present vocoder transmission systems, the data usually consists of a 2400 bit synchronous serial binary stream. Unlike the error restrictions imposed on teletype data and computer data transmission systems, vocoder systems are allowed relatively high transmission error rates because of the sufficiently redundant characteristics of the input speech waves. In view of these general characteristics of the three data transmission categories of interest, it will be noted that vocoder data transmission places the least stringent performance requirements on the data modem.

A second consideration in the provision of improved data modems is the electromagnetic environment in which such equipments are required to operate. High frequency and wireline transmission media differ considerably and thus require separate analysis. Wireline system bandwidths are normally limited to 3 kc., a limitation which is complicated by unequal delays for various frequencies within the passband. As noted in Lincoln Laboratory Technical Report No. 263, entitled, "The COBI Data Transmission Modem," as much as three milliseconds variation in relative delay between frequencies may be experienced within an acceptable amplitude passband. Obviously, this unequal delay characteristic will, if uncorrected, result in severe signal distortion, so that delay equalizers are required for high speed data transmission. Another characteristic of wireline media detrimental to data transmission is that telephone channels are subject to sudden changes in gain over the entire passband. Moreover, wirelines are affected by impulse noise which is often of greater amplitude than the signal lever and which covers a broad frequency spectrum.

High frequency transmission systems, on the other hand, are affected by a multitude of disturbances which vary with the peculiar physical characteristics of the facility and with atmospheric, ionospheric and cosmic phenomena. These disturbances include flat fading, frequency selective facing, cosmic noise, impulse noise, atmospheric noise, and interference from adjacent systems. Consequently, it is quite difficult to accurately predict the future behavior of any high frequency system except on a statistical basis.

The maximum bit rate is limited in these transmission systems by several factors, principally including system bandwidths on the order of several kilocycles and multiple propagation paths which result in time smearing. Phase modulation systems are often badly corrupted by phase instability of the transmission medium, while amplitude modulation systems are subject to severe signal fading. Frequency shift keying (FSK) has been successful to some extent in achieving low error rates, but has the disadvantage of being wasteful of bandwidths.

It will be readily appreciated from the considerations noted above and from the vast number of other considerations which must be given each particular data transmission system, that the problem of providing a single data modem which is versatile in its applicability to existing data transmission systems and which is predictably compatible with systems presently undergoing development, with regard to type of data to be transmitted, available transmission media, and type of modulation desired, is indeed an imposing and challenging one.

The transmission of data over high frequency radio links or wire links is generally accomplished more efficiently by use of frequency-division multiplex techniques than by time-division multiplexing in that the deleterious effects of multipath propagation and differential time delays across the band can more easily be avoided. However, the frequency-division system requires greater equipment size and complexity and is generally less flexible in operation than time-division systems.

In accordance with present invention, there is proivded an improved data modem which may be employed in both high frequency and wireline systems applications, with varying types of data transmission, and which offers the advantageous performance of frequency-division multiplex with the apparatus simplicity associated with time-division. Briefly describing a preferred embodiment, the information to be transmitted is applied in the form of a serial digital (e.g. binary) stream of data to a format converter whose function is to encode the input data stream in a time-division format. The format converter, which constitutes the key to the operational flexibility of the data modem, is operative to produce two streams of numbers in the form of in-phase and quadrature related digital data words having a predetermined relationship to the input digital stream and conforming to a preselected time-division format. These two word streams are fed into an arithmetic unit which functions to convert the time-division format to a frequency division format comprising a parallel pair of sequential frames of digital data in phase quadrature relationship. Each frame sequence is processed through a separate one of parallel channels for digital-to-analog conversion and attenuation of frequencies above a predetermined value. The resulting pair of analog signals are suitably modulated and combined for transmission in the frequency-division format. At the receiving terminal an inverse operation is performed to reproduce the original serial binary stream.

By initially encoding the information to be transmitted in a time-division format, and then converting from time-division to frequency-division by means of a digital processing technique, all of the modulators, demodulators, subcarrier oscillators and band-pass filters conventionally employed in frequency-division systems are eliminated. In essence, then, the present invention provides a data modem wherein all of the parallel processing channels ordinarily used in conventional frequency-division modems are replaced with a single sequential iterative computational process. This process permits number of channels, spacing of frequency channels, type of modulation associated with each channel (e.g. on-off, $n$-level PSK, $n$-level FSK), optimum demodulation associated with each type of modulation, individual data rates associated with each channel, and diversity combining of various channels to be readily and automatically controlled.

It is therefore another object of the present invention to provide a data modem wherein the advantageous performance of frequency-division multiplex is achieved with the apparatus simplicity of time-division systems.

A further object of the invention is to provide a data transmission system wherein a serial stream of digital data is encoded in a time-division format and the latter format converted to a frequency-division format for transmission to a receiving terminal.

It is a feature of the present invention to provide a multiplex configuration of frequency-division to minimize multipath interference and the effects of differential time delays across the band, and wherein it is possible to provide as many as 500 frequency channels spaced 8 c.p.s. apart in a 4-kc. band, with equipment size very nearly independent of number of channels provided.

A further feature of the invention is the provision of sequential rather than parallel signal processing in both modulator and demodulator, whereby size and complexity of terminal equipment is substantially reduced.

Still another feature of the present invention resides in the provision of apparatus wherein individual channel signals can be formed using any standard modulating process including $n$-level amplitude keying, $n$-level frequency shift keying, and $n$ level phase shift keying for digital input signals.

It is another feature of the invention to provide a demodulation process whereby either coherent, non-coherent, or differentially coherent detection of signals in noise background may be achieved.

A further feature of the present invention resides in the capability of the modem of handling any combination of analog and digital information, and wherein the information may be contained within a single input channel or distributed over a large number of input channels. Digital data rates of, for example, 5400 bits per second or higher are made possible over a nominal 4-kc. wireline.

Still another feature of the invention is that synchronization may be conventionally achieved through the transmission of pilot tones, and that each of the frequency channels may, if desired, be independently synchronized.

Yet another feature of the present invention lies in its anti-jamming capability which may be achieved by pseudo-randomly changing the output frequency channel over which a single input channel is transmitted. For example, an 8 bit/second input channel may be distributed in pseudo-random sequence over 500 channels in a 4-kc. band, thereby providing 27 db reduction in vulnerability to jamming.

Another object of the invention is to provide apparatus for generating band-limited signals comprising means for converting an input digital data stream into digital data sequences of amplitude values of sine and cosine components of the signal to be generated, means for transforming the sequences of sine and cosine amplitudes into sequences representative of amplitude samples of the in-phase and quadrature components of the output signal, and means for converting the amplitude representative samples to an analog band-limited output signal.

Still another object of the invention is to provide apparatus for analyzing band-limited signals in terms of their Fourier components, including means for converting an analog input signal into sequences representative of digital amplitude values of the in-phase and quadrature components thereof, and means for transforming the sequences into further sequences representative of the amplitudes of the individual sine and cosine components of the input signal. It is a further object of the present invention to provide methods for generating band-limited signals from an input data stream by first encoding the stream in a time-division format of phase quadrature related digital data words and subsequently converting the time division format to a frequency-division format.

Another object is to provide means for analyzing band-limited signals in terms of the Fourier components thereof.

The above and still further objects, features and attendant advantages of the present invention will become apparent from a consideration of the following detailed description of a specific embodiment thereof, especially when taken in conjunction with the accompanying drawings, in which:

FIGURE 3 is a chart illustrating the time-slot frequency channel relationships for the output signal S($t$) of the transmitting terminal of FIGURE 1;

Figure 1:
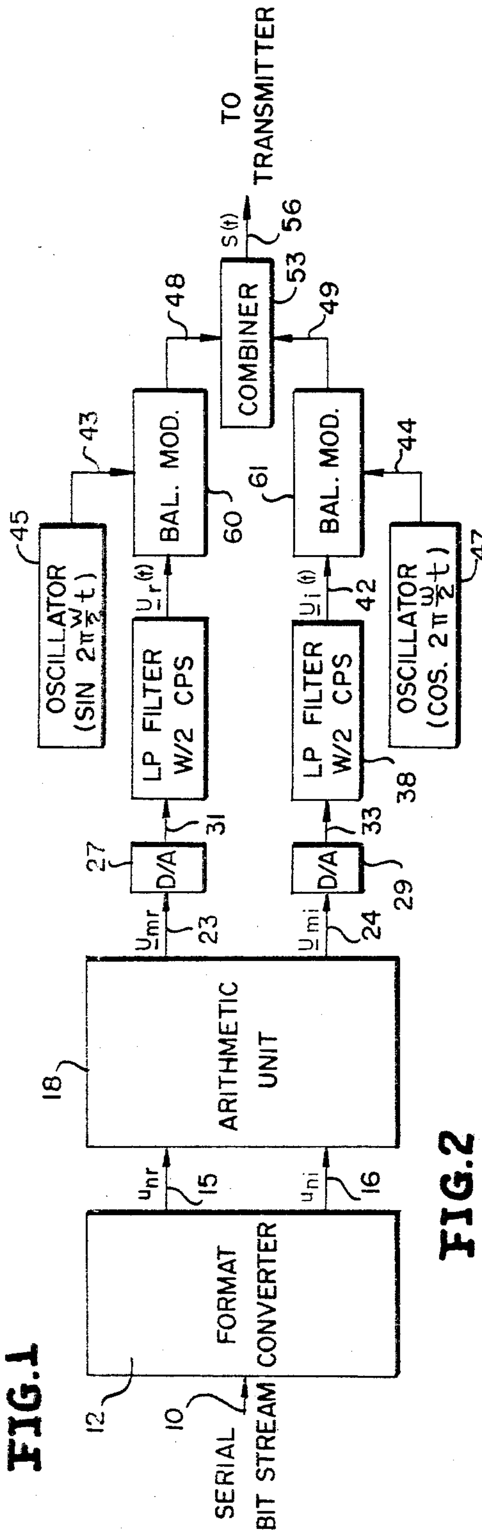
FIGURE 1 is a simplified block diagram of the transmitting terminal of a data modem according to the present invention.
Figure 5:
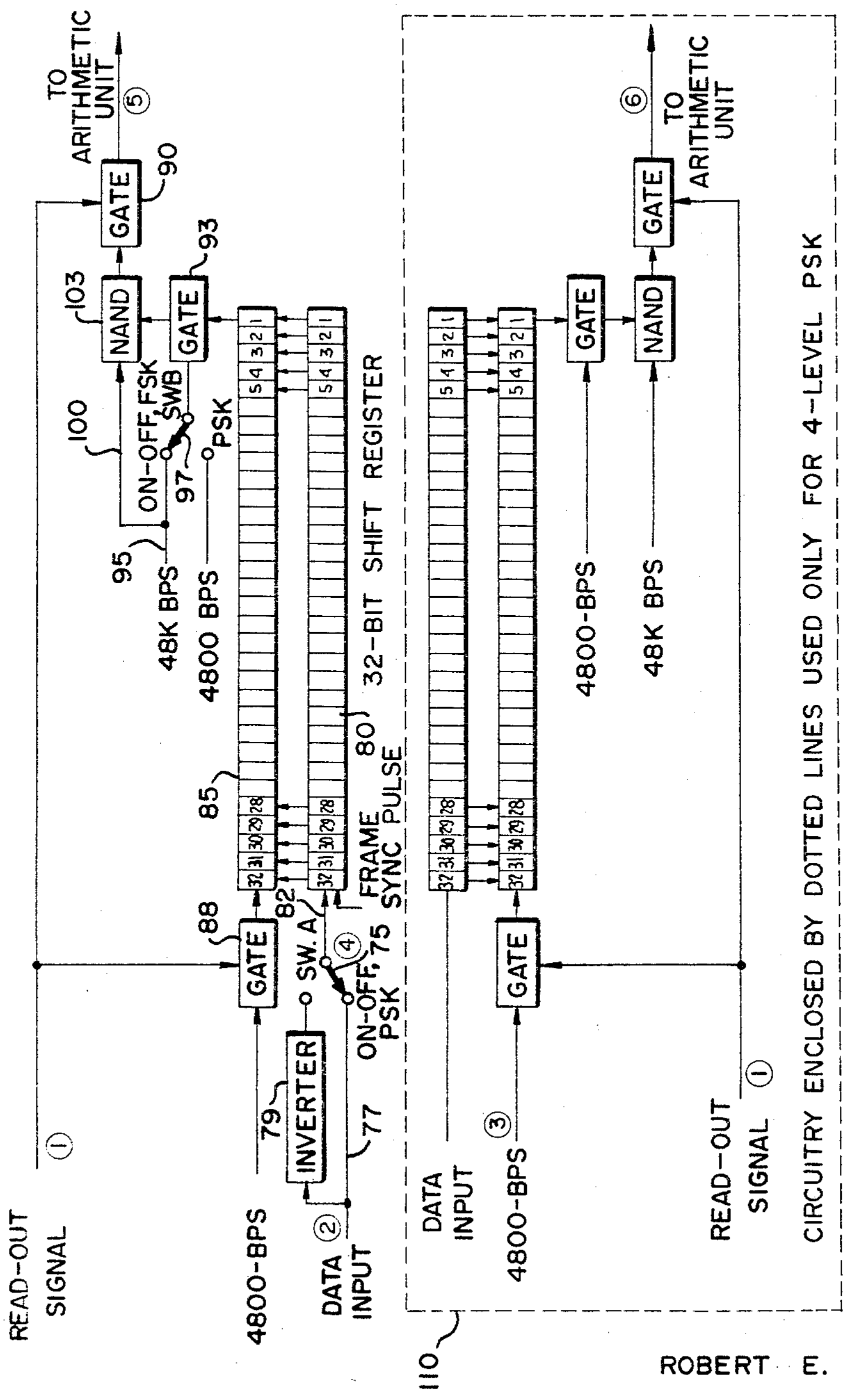
Figures 6A, 6B, 6C, 6D, 6E:
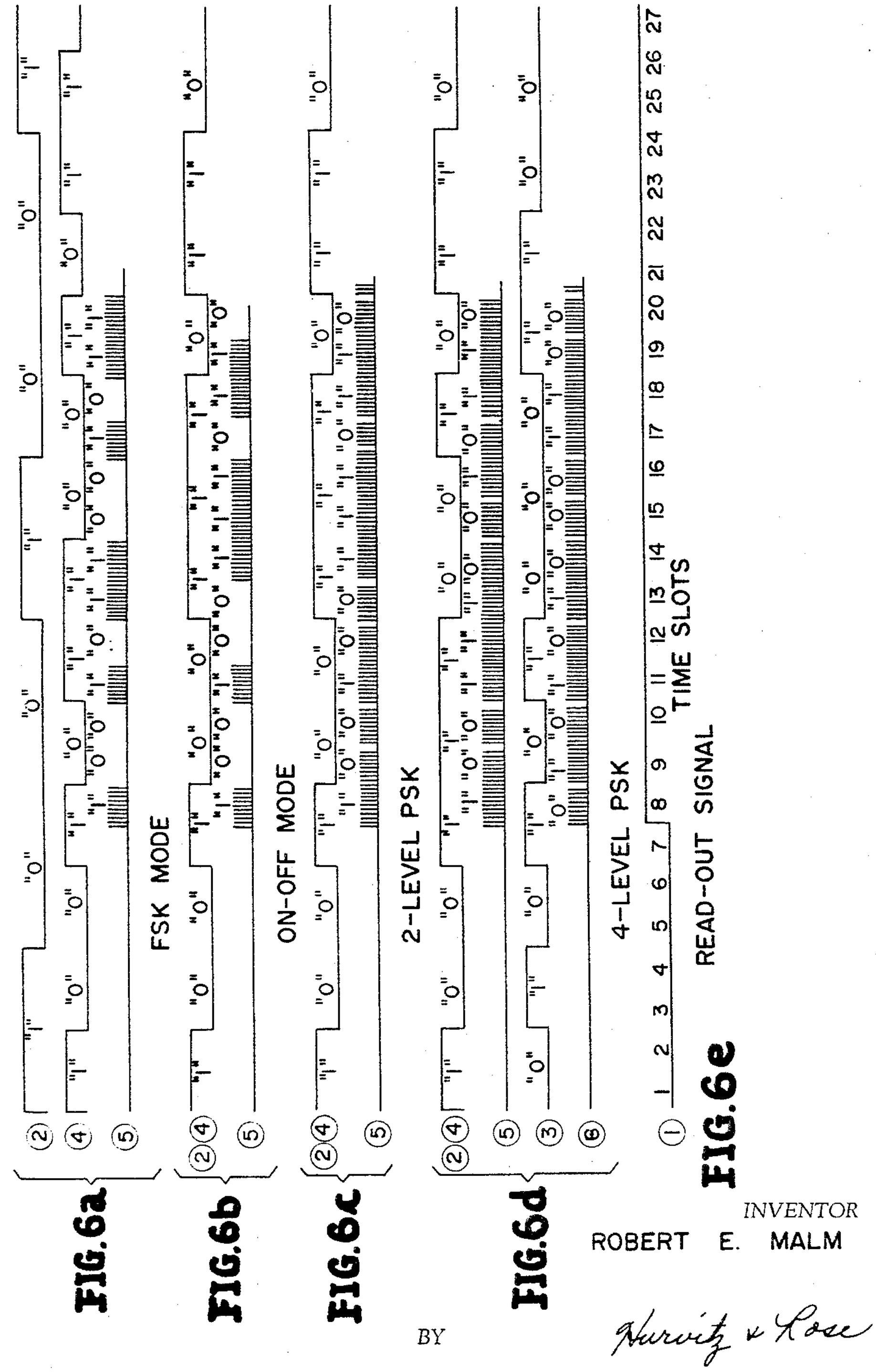
Figure 7A:
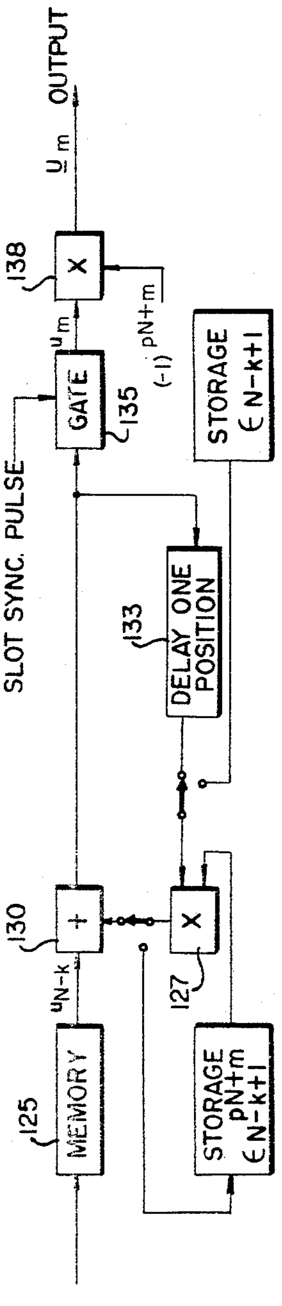
Figures 8, 9:
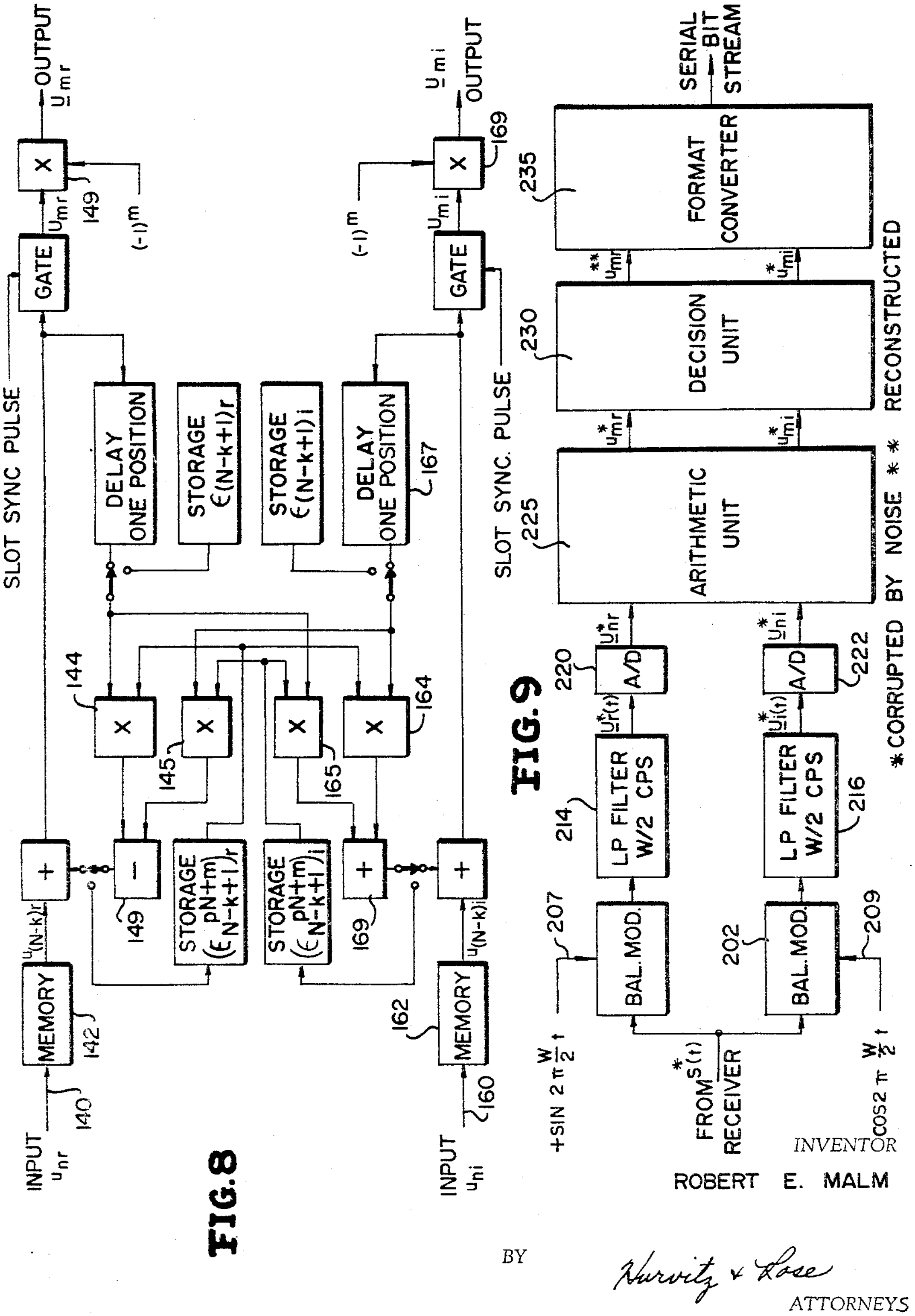
Figure 13:
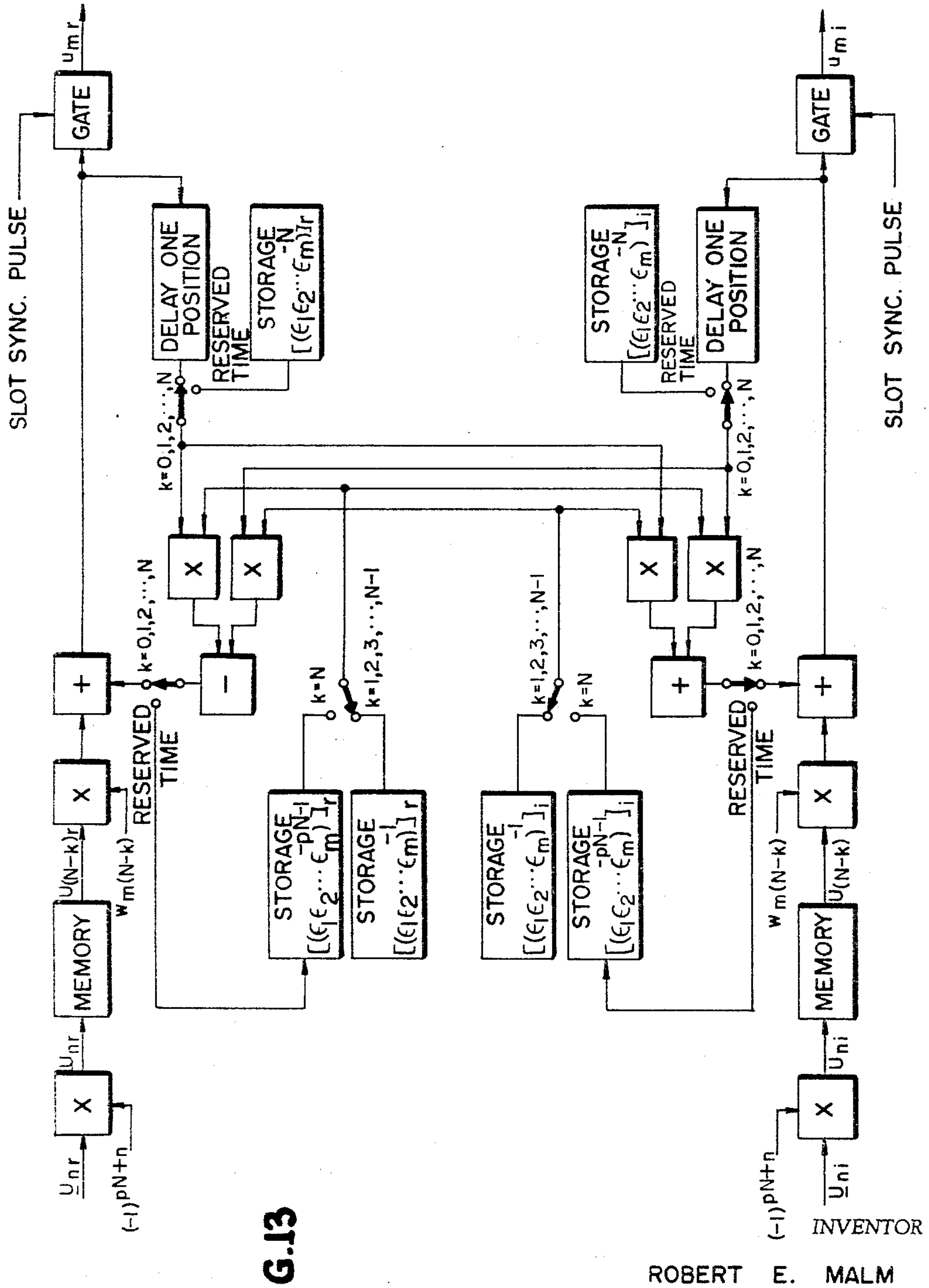

FIGURES 4*a*, *b*, *c* and *d* are charts of four illustrative format conversions corresponding to the four transmission modes FSK, On-Off, 2-level PSK, and 4-level PSK;

FIGURE 5 is a block diagram of an illustrative embodiment of the format converter of FIGURE 1;

FIGURES 6*a*, *b*, *c*, *d* and *e* are diagrams of pulse trains at various points in the format converter of FIGURE 5;

FIGURES 7*a*, *b*, and *c* are respectively a block diagram of an illustrative embodiment of the arithmetic unit of FIGURE 1 suitable for explaining complex conversion, and a pair of charts illustrating operation of the arithmetic unit;

FIGURE 8 is a block diagram of an illustrative embodiment of the arithmetic unit of FIGURE 1 for processing real (i.e. in-phase and quadrature component) numbers;

FIGURE 9 is a simplified block diagram of the receiving terminal of data modem in accordance with the present invention;

FIGURES 10*a* and *b* are respectively a block diagram of an illustrative embodiment of the decision unit of FIGURE 9, and a chart indicating comparison levels and transfer rules in the operation of the decision unit;

FIGURE 11 is a block diagram of an illustrative embodiment of the format converter of FIGURE 9;

FIGURES 12*a* and *b* are respectively a block diagram of a complex number arithmetic unit suitable for use at the demodulator terminal, and a chart illustration operation of the arithmetic unit; and FIGURE 13 is a real number conversion embodiment of the arithmetic unit of FIGURE 12*a*.

Referring now to the drawings, the transmitting terminal equipment for a data modem according to the present invention is exemplified in block diagrammatic form in FIGURE 1. The information to be transmitted, consisting, for example, of a serial binary stream, is applied as an input 10 to a format converter 12 which is operative to produce therefrom a stream of complex numbers $u_n$, having real and imaginary parts $u_{nr}$ and $u_{ni}$, respectively (i.e. $u_n=u_{nr}+ju_{ni}$), in a time-division format at outputs 15 and 16. Purely for purposes of clarity in explaining the timing and operation of the various elements of the transmitting terminal, the output of format converter 12 is divided into frames of data, each frame consisting of N slots or time intervals, and each slot occupied by a number (or data word) $u_{nr}$ and $u_{ni}$ appearing respectively as outputs 15 and 16. This situation is illustrated by the processing procedure chart of FIGURE 2, where the input bit stream 10 comprises successive portions A, B . . . X which are converted into a frame M of data in a time-division format. The data words or numbers $u_n$ generated by the format converter have real and imaginary parts $u_{nr}$ and $u_{ni}$, corresponding to $u_{1r}$, $u_{2r}$ . . . $u_{Nr}$ and $u_{1i}$, $u_{2i}$ . . . $u_{Ni}$ respectively occupying slots 1, 2 . . . N, and constitute the desired time-division format.

Figure 2:
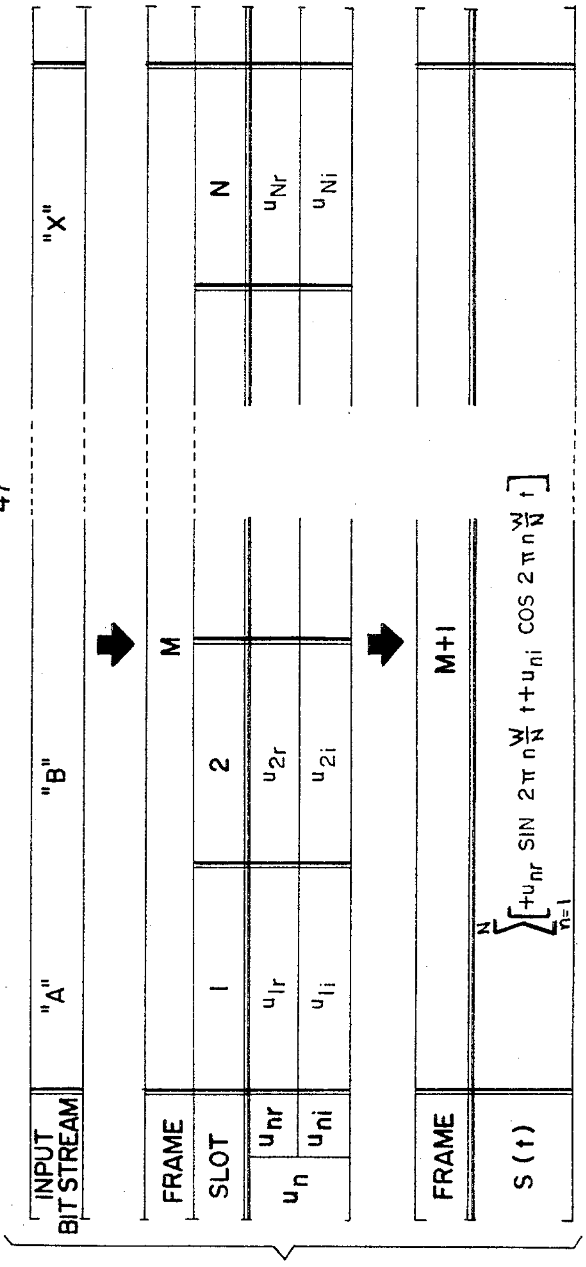
FIGURE 2 is a chart illustrating the information processing procedure of the transmitting terminal apparatus of FIGURE 1.

The remainder of the transmitting terminal apparatus processes each time-division frame of data to produce an output signal S($t$) consisting of sine and cosine waves consistent with a preselected frequency-division format and having amplitudes given by the values of $u_{nr}$ and $u_{ni}$ respectively. In FIGURE 2, the frequency-division signal S($t$) for the $(M+1)$th frame is illustrated as the summation of sine and cosine waves formed from the data words occupying the slots 1, 2 . . . N, of the Mth frame, or mathematically $$S(t)=\sum_{n=1}^{N}\left[+u_{nr}\sin 2\pi n\frac{W}{N}t+u_{ni}\cos 2\pi n\frac{W}{N}t\right] \quad (1)$$

where all symbols which have not thus far been explained will be defined presently. It is to be emphasized that this is merely an example and that a more general expression for S($t$) will be developed as the description proceeds.

Thus, according to the present invention, the transmitting terminal of the data modem implements the requirement that as an intermediate step in the formation of the frequency-division multiplexed signal carrying the input information a time-division format be established. The time-division configuration and the frequency-division configuration, with exemplary numerical values in parentheses, are characterized in Tables 1 and 2, respectively, below.

TABLE 1

*Time-division configuration*

| | |
|---|---|
| Slot rate | W (4800 bits/sec.). |
| Number of slots per frame | N (64). |
| Frame rate | $W/N$ (75 f.p.s.). |
| Number of guard slots | $N_g$ (32). |
| Number of information carrying slots | $N-N_g$ (32). |
| Bits/slot | P (1). |
| Information rate | $P(N-N_g)W/N$ (2400 bits/sec.). |

TABLE 2

*Frequency-division configuration*

| | |
|---|---|
| Design bandwidth | W (4800 c.p.s.). |
| Total number of frequency channels | N (64). |
| Channel spacing | $W/N$ (75 c.p.s.). |
| Number of guard channels | $N_g$ (32). |
| Number of information carrying channels | $N-N_g$ (32). |
| Occupied bandwidth | $(N-N_g)W/N$ (2400 c.p.s.). |
| Bits/cycle | $p$ (1). |
| Information rate | $p(N-N_g)W/N$ (2400 bits/sec.). |

It will be noted by reference to FIGURE 3 that for the frequency-division signal S($t$) of FIGURE 2 the first time slot controls the first frequency channel; the second time slot, the second frequency channel; the third time slot, the third frequency channel; and so on until the Nth time slot, which controls the Nth frequency channel, completes the frame.

Having specified the general operation of, and certain illustrative signal values appearing at various points in the transmitting terminal equipment of FIGURE 1, it is of value at this point to set forth a specific, but purely illustrative, embodiment of format converter 12, deferring a more elaborate treatment of the structure and operation of the remainder of the transmitting terminal until later in this specification. In describing the format converter, reference will be made to a frequency-division multiplex configuration of thirty-two tones spaced 75 c.p.s. apart in the frequency range from 600 c.p.s. to 2925 c.p.s.; to frequency shift keying (FSK), On-Off, 2-level phase shift keying (PSK), and 4-level PSK, as types of modulation; and to data rates of 1200 bits/sec. (for FSK), 2400 bits/sec. (On-Off, 2-level PSK), and 4800 bits/sec. (4-level PSK), but it is to be emphasized that these particular parameters are employed merely for the sake of clarity and convenience and are not meant to impose any limitations or constraints on the structure or performance of the data modem or any of its component parts which will be defined with particularity in the appended claims. With these considerations clearly in mind, reference is now concurrently made to FIGURES 4, 5 and 6 which relate to the structure and operation of format converter 12.

In FIGURES 4*a*, 4*b*, 4*c* and 4*d*, four examples for format conversion are given, viz, On-Off, 2-level PSK, FSK, and 4-level PSK, respectively. Referring more particularly to FIGURE 4*a*, the conversion process set forth therein results in the sine wave being keyed on if a "1" is to be transmitted and being keyed off if a "0" is to be transmitted. It will further be noted that the amplitude of the cosine wave is zero at all times; that is, irrespective of whether the information bit to be transmitted is a "1" or a "0." This particular conversion process permits the transmission of 1 bit/second for every cycle per second of bandwidth.

In FIGURE 4*b* the conversion process corresponds to two-level phase shift keying. If the bit to be transmitted is a "1," a sine wave of unit amplitude is generated. If a "0" is to be transmitted, the amplitude of the sine wave is reversed in sign. Again, the amplitude of the cosine wave is always zero. As in the On-Off conversion process indicated in FIGURE 4*a*, the transmitting capability is 1 bit/cycle.

In FIGURE 4*c*, each input bit controls two adjacent time slots (viz, $u_{(2n)r}$, $u_{(2n-1)r}$, and $u_{(2n)i}$, $u_{(2n-1)i}$) so that a "0" keys on the sine wave associated with one frequency channel while a "1" keys on the sine wave associated with an adjacent frequency channel, thereby providing frequency shift keying. The transmitting capability with this type of modulation is only one-half bit per cycle. Once again, the cosine waves are not used.

Referring to FIGURE 4*d*, the incoming bits are grouped in pairs, a "00" combination keying both sine and cosine waves on with negative amplitudes, a "01" keying the sine wave on with a positive amplitude and the cosine wave on with a negative amplitude, a "10" keying the sine wave on with a negative amplitude and the cosine wave on with positive amplitude, and finally, a "11" combination keying both sine and cosine waves on with positive amplitudes. This process results in four-level phase shift keying (i.e., 0°, 90°, 180°, and 270°) and the capability of transmitting 2 bits per cycle.

Again, it will be noted that the above examples by no means exhaust the number of format conversions possible nor the wide variety of possible modulation schemes. Moreover, in some cases, it may be desirable to systematically use the same type of modulation on all frequency channels, while in other cases the choice of a different type of modulation for each channel or group of channels may be preferred. In any event, the ease with which the type of modulation can be changed will readily lead to the recognition that systems in accordance with the present invention may be rendered adaptive to a variety of environments in which they may be required to operate by simply effecting such changes by a systematic or predetermined programming of the operation of the format converter unit. In this respect, the format converter is the key to the operational flexibility of the data modem herein described.

As previously stated, the format converter 12 (FIGURE 1) functions to produce two streams of numbers (i.e. data words) consisting respectively of the real and imaginary components (i.e. a phase quadrature relationship) of a stream of complex numbers having specified relationships to the input bit stream and conforming to a particular time-division format (e.g. as set forth in Table 1). In Tables 1 and 2, above, the parameter values listed correspond, in this example, to those for the On-Off and 2-level PSK modes. For the FSK mode, *p* is equal to one-half with a resulting data rate of 1200 bits/sec., while for the 4-level PSK mode, *p* is equal to 2 with a resulting data rate of 4800 bits/sec. Similarly with reference to those tables, of the 64 available time slots, slots 1–7 and 40–64 are arbitrarily selected as guard slots so that only those tones falling in the band from 600 c.p.s. to 2925 c.p.s. (i.e. channels 8–39, inclusive) will appear in the output. Referring now to FIGURES 5 and 6, it is assumed, for reasons which will become clear in the subsequent description of the arithmetic unit, that the format converter for the transmitting terminal is to convert the input serial data stream 10 into two 10-bit word streams suitable for processing by the arithmetic unit. Selection of a particular one or more of the four illustrative conversions corresponding to the four transmission modes, FSK, On-Off, 2-level PSK, and 4-level PSK may be made, for example, by operation of conventional switches on the front panel (not shown) of the converter equipment.

In the FSK mode, switch 75 is operated back and forth between its two positions at the rate of 2400 times per second. Of course, while a simple mechanical switch is shown, switch 75, as well as the other switches to which reference will be made from time to time, may comprise any conventional high speed switch which is capable of operation at the specified rates. The 1200 bit/second input data stream is applied to the switch contacts via direct path 77 and inverter 79, respectively, so that the original data stream and its inverse are automatically sampled to form a 2400 bit/sec. stream. Thus, a "1" at point 2 in FIGURE 5 generates a "10" at point 4 (assuming switch 75 is initially positioned as shown in the figure), and a "0" at 2 generates a "01" at 4. In this respect, see also FIGURE 6*a*, showing pulse trains relating specifically to the FSK mode at various encircled numbered points in the circuit of FIGURE 5.

During one frame period, 32 bits are entered in the 32-bit shift register 80 via path 82, and a frame sync pulse is employed to effect a parallel transfer of the contents of the shift register to corresponding stages (or storage elements) of adjacent 32-bit shift register 85. At the end of the frame period, a serial read-out signal, as shown in FIGURE 6*e*, is applied to gates 88 and 90 for the period extending from the eighth to the thirty-ninth time slots of each frame. During this period, the contents of the 32-bit shift register 85 are shifted to the right through the first storage element of the shift register for application to gate 93. Gate 93 is conventionally arranged so that when the first storage element of shift register 85 contains a "0" a 48K b.p.s. pulse train applied at conductive path 95 is passed through gate 93 via switch 97 to inhibit the passage of the 48K pulse train at path 100 through NAND gate 103. On the other hand, when storage element 1 of shift register 85 contains a "1," gate 93 is closed to prevent passage of the 48K pulse train therethrough so that the 48K pulse train on lead 100 is permitted to pass through NAND gate 103, through gate 90, and into the arithmetic unit 18 of FIGURE 1. This sequence of operation by format converter 12 accomplishes the desired FSK format conversion described by FIGURE 4*c* and illustrated by FIGURE 6*a*. The input to the arithmetic unit is thus the stream of numbers $u_{nr}$, representative of amplitude of the sine component. The numbers $u_{ni}$, representative of amplitude of the cosine component, are always equal to zero for the FSK mode.

The On-Off mode of the format converter is identical to the FSK mode described above, except that switch 75 remains at all times in the position shown in FIGURE 5. A 2400 bit/sec. (b.p.s.) data input applied at point 2 (see also FIGURE 6*b*) is thus fed serially into 32-bit shift register 80. At the end of the frame period the shift register is completely filled (i.e. contains 32 bits of information) and a parallel transfer of its contents to shift register 85 is accomplished by application of a frame sync pulse. The remaining operations are identical to those described for the FSK mode.

In the 2-level PSK mode, operation of the format converter corresponds to that for the On-Off mode, except that a "0" in storage element 1 of shift register 85 permits passage of the 4800 b.p.s. pulse train through gate 93 (via switch 97, which has been thrown to the alternate pole or contact for PSK mode) to NAND gate 103. Hence, the first nine pulses of the 48K pulse train on lead 100 are passed by the NAND gate, but the 10th pulse is prevented from passing by the simultaneous appearance of a pulse from the 4800 b.p.s. pulse train at the other input to the NAND gate. This situation will be better appreciated by concurrent reference to FIGURE 6*c*. As shown therein, each "1" in the input data stream is replaced by a 10-pulse group (i.e. 1111111111), and each "0" by a 9-pulse group (i.e. 1111111110), with the presence of a pulse in the 10th position indicating a plus sign and the absence of a pulse at that position indicating a minus sign.

The 4-level PSK format conversion is accomplished by paralleling two 2-level PSK circuit configurations, i.e. the circuitry of the format converter as previously described and, in addition, the provision of corresponding circuitry simplified to the extent that only 2-level PSK operation is required. This arrangement is also shown in FIGURE 5 where the upper portion of the figure is arranged for 2-level PSK mode and the lower portion of the figure (viz, circuit 110, enclosed in dotted lines) is paralleled therewith to provide the desired 4-level PSK conversion. Operation of each portion is identical to that disclosed above for the 2-level PSK conversion. An exemplary showing of the pulse trains appearing at points 1–6 in FIGURE 5 is indicated in FIGURES 6*d* and *e*. FIGURE 6*e* is, of course, applicable to each format conversion which has been described since it shows the pulse train corresponding to the read-out signal at point(s) 1 in each case. For the 4-level PSK format conversion the output at point 5 supplies one input to the arithmetic unit and the output at point 6 supplies the other input.

All elements of the format converter shown in FIGURE 5 are conventional, the novelty attributable to its specific operation lying in the cooperative relationship between these various elements. Again, other circuit arrangements will become apparent to those skilled in the art from a consideration of this specification and the concepts underlying the present invention, so that no limitations or constraints are to be placed upon the invention by the specific circuit embodiments disclosed, except as set forth in the appended claims.

Figure 7B:
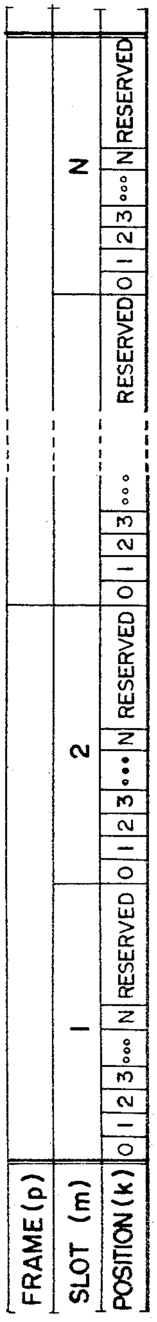
Figure 7C:
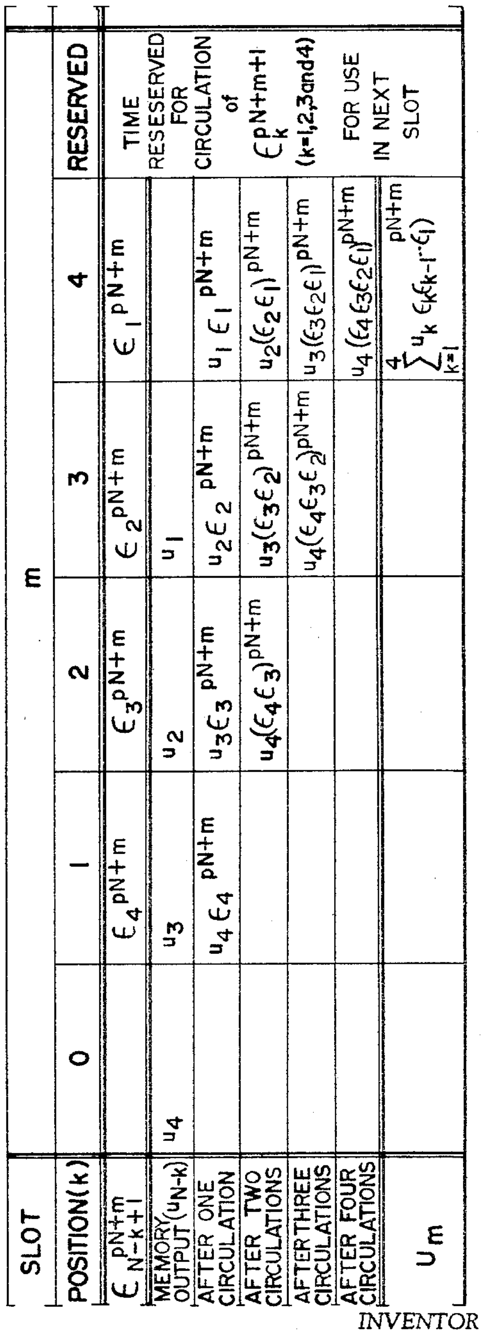

Reference is now made to FIGURES 7*a*, 7*b* and 7*c* wherein are respectively shown a block diagram of one embodiment of the arithmetic unit of FIGURE 1, especially useful in explaining the processing of complex numbers $u_n$ from the format converter, and charts indicative of the operation of the arithmetic unit. As previously noted, the format converter 12 produces a pair of streams or numbers, $u_{nr}$ and $u_{ni}$, corresponding to the real and imaginary parts of a stream of complex numbers $u_n$ and having specified relationships to the input data stream and conforming to a particular time-division format. The operation to be performed on these numbers in the arithmetic unit is purely digital in nature and consequently the numbers themselves are expressed in digital form.

More particularly, it is the function of arithmetic unit 18 to convert the time-division format produced by format converter 12 to a frequency-division format. In order to best present the manner in which this function is implemented and accomplished, it is convenient to first discuss the principles of operation of the arithmetic unit in which all elements are assumed to be capable of handling complex numbers. Thereafter, an operative embodiment of the arithmetic unit suitable for processing real numbers will be described. In FIGURE 7*a*, the input words $u_1, u_2, u_3 \ldots u_N$, corresponding to one frame of information, are read into a memory unit 125 of arithmetic unit 12. The stored data is repetitively read out in reverse order during the next successive frame at a rate somewhat higher than N times the input rate so that the output of memory 125 is $u_N, u_{N-1}, u_{N-2} \ldots u_1$ for each time slot of the last-mentioned frame. Referring to the timing diagram of FIGURE 7*b*, $u_N$ appears in the 0th position of each slot, $u_{N-1}$ in the first position, $u_{N-2}$ in the second position . . . and finally $u_1$ in the $(N-1)$th position.

During the *m*th time slot, the output of memory 125 $u_{N-k}$ is added to the output of the multiplier 127 by adder 130, the adder output delayed by one position through delay unit 133 (for example, a one-position delay line), multiplied by a complex number $$\epsilon_{N-k+1}^{pN+m}$$

where *p* corresponds to the frame number, *m* has the values 1, 2 . . . N, corresponding to the particular time slot during which the operation is performed, and *k* has the values 1, 2 . . . N, corresponding to a particular position within a time slot, and added to the memory output. This process is repeated until the Nth position of the time slot is reached, at which time a slot sync pulse is applied to gate 135 to permit passage of the contents of the adder therethrough. Hence at the end of the Nth position of each time slot an adder output $U_m$ is gated to multiplier 138 for appropriate sign change, if the number $(pN+m)$ is an odd-numbered one, and supplied as an output $\underline{U}_m$ of the arithmetic unit. This process is illustrated in FIGURE 7*c* for the case where $N=4$. The change in sign of the outputs $U_m$ occurring for the odd-numbered values of $(pN+m)$ is achieved by application of a $(-1)^{pN+m}$ signal from any suitable function generator or from a storage unit to multiplier 138, where *p* and *m* have the previously defined values corresponding to frame and time slot number respectively. The complex number $$\epsilon_{N-k+1}^{pN+m+1}$$

required for the $(m+1)$th slot computation is obtained by reserving a small interval of time at the conclusion of the *m*th slot interval during which the contents of the storage unit $$\epsilon_{N-k+1}^{pN+m}$$

is read out, multiplied by $\epsilon_{N-k+1}$ stored in another storage unit and read back into storage for subsequent application to multiplier 127 during the $(m+1)$th slot interval.

At the end of each time slot, the elements in the arithmetic unit loop are cleared and a new computation is begun for the memory output during the next time slot. Each computation proceeds in an identical fashion to that which has just been described, except that the multiplicand of multiplier 127 takes on the appropriate values for the particular frame, slot, and position of concern. For each even-valuated $(pN+m)$ the contents of adder 130 at the Nth position in the slot is passed through gate 135 and multiplier 138 without sign change.

As is apparent from a consideration of the arithmetic unit operation shown in FIGURE 7*c*, the output of gate 135 during the *m*th slot and the *p*th frame is simply $$U_m=\sum_{k=1}^{N} u_k(\epsilon_k\epsilon_{k-1} \ldots \epsilon_1)^{pN+m} \qquad (2)$$

We assume $\epsilon_k$ to be a complex number with absolute value equal to one:

$$\epsilon_k = \exp j2\pi \frac{1}{M_k} \quad (3)$$

where $M_k$ is an arbitrary parameter which is a function of position in a slot. Substituting this expression for $\epsilon_k$ in the expression for $U_m$ we obtain $$U_m = \sum_{k=1}^{N} u_k \exp\,[j2\pi(pN+m)\,\alpha_k] \quad (4)$$

where $$\alpha_k = \frac{1}{M_1} + \frac{1}{M_2} + \cdots + \frac{1}{M_k}$$

The output of the arithmetic unit is $$\underline{U}_m = (-1)^{pN+m} U_m = \exp\,[-j2\pi(pN+m)/2]\,U_m \quad (5)$$

and substituting Equation 4, above into this expression $$\underline{U}_m = \sum_{k=1}^{N} u_k \exp\,[j2\pi(pN+m)\cdot(\alpha_k - \tfrac{1}{2})] \quad (6)$$

The computational procedure just described can be implemented for real number processing by providing two computation channels as shown in FIGURE 8. The real number input 140 is applied to memory 142 while imaginary number input 160 is applied to memory 162. Thus, the phase quadrature components $u_{nr}$ and $u_{ni}$ of the complex number stream $u_n$ are handled separately in parallel intercoupled channels with operation being substantially identical to that described for the signal channel of FIGURE 7*a*. In FIGURE 8, however, the multiplicand $$\epsilon_{N-k+1}^{pN+M}$$

is split into its real and imaginary components $$[\epsilon_{N-k+1}^{pN+m}]_r \text{ and } [\epsilon_{N-k+1}^{pN+m}]_i$$

necessitating the employment of a pair of multipliers 144, 145 and 164, 165, respectively, in the loops of each of the upper and lower channels. Referring to the real number processing channel with input 140, the pair of inputs to multiplier 144 is obtained from delay unit 147, as before, and the stored multiplicand, here $$[\epsilon_{N-k+1}^{pN+m}]_r$$

and the inputs applied to multiplier 145 obtained from delay unit 167 of the opposite channel and stored multiplicand $$[\epsilon_{N-k+1}^{pN+m}]_i$$

Corresponding inputs are applied to the two multipliers 164, 165 in the opposite (imaginary number processing) channel, and the respective pairs of multiplier outputs combined, by subtractor 149 in the real number channel, by adder 169 in the imaginary number channel, for addition to the respective memory outputs for the next successive time slot.

By analogy to the operation of the complex-number-processing arithmetic unit of FIGURE 7*a*, the outputs $\underline{U}_{mr}$ and $\underline{U}_{mi}$ of the arithmetic unit of FIGURE 8 may be obtained simply as the real and imaginary parts of $\underline{U}_m$ given by expression (6).

$$\underline{U}_{mr} = \sum_{k=1}^{N} \{u_{kr} \cos\,[2\pi(pN+m)\cdot(\alpha_k - \tfrac{1}{2})] - u_{ki} \sin\,[2\pi(pN+m)\cdot(\alpha_k - \tfrac{1}{2})]\}$$

$$\underline{U}_{mi} = \sum_{k=1}^{N} \{u_{kr} \sin\,[2\pi(pN+m)\cdot(\alpha_k - \tfrac{1}{2})] + u_{ki} \cos\,[2\pi(pN+m)\cdot(\alpha_a - \tfrac{1}{2})]\}$$

Having obtained the sequences $\underline{U}_{mr}$ and $\underline{U}_{mi}$, the only remaining requirement to provide the desired frequency-division signal is that of converting these two sequences to analog signals. Before discussing the circuitry for performing that conversion, however, it is necessary to consider certain aspects of the operation of the arithmetic unit by which some of the aforementioned features of the present invention are provided. One of the fundamental decisions to be made in the implementation of the arithmetic unit is the word length to be used in the computation. The length of the word determines the computational precision and, thereby the purity of the generated tones from the data modem modulator and the detectability of these tones in the data modem demodulator. It has been found that the use of input/output word lengths of nine bits plus sign and the retention of fifteen bits plus sign during the computational processes within the arithmetic unit limits the computational noise associated with the generation of particular tones to approximately −28 db. Hence, in the previously described illustrative operation of the format converter, the various types of modulation were each arranged to provide word lengths of nine bits plus sign to the arithmetic unit. Again, however, it is to be emphasized that other input/output word lengths, as well as different internal word lengths, may be used for the computation process performed by the arithmetic unit. For example, the noise level can be suppressed to an even greater degree by increasing the word length over that of the examples given above.

The memory units employed in the arithmetic unit must, for operation with bit rates as set forth in the description of the format converter, be capable of read-in rates of 4800 words per second and read-out rates of 307,200 words per second. Of the many possible choices available, conventional core storage is preferred from the standpoints of both cost and convenience. In addition to the two memory units 142, 162 used in the illustrative embodiment of FIGURE 8, it may be desired to provide an additional memory unit (not shown) in each of the data word channels 15 and 16 (FIGURE 1) as buffers between format converter 12 and arithmetic unit 18. Such buffering may also be desired in the receiving terminal equipment, to be described presently. All other elements of the arithmetic unit of FIGURE 8 may also be of conventional type. The cosine and sine multiplicands for the exemplary parameters given above are ten-bit numbers and consequently a clock rate of 10×307,200 or approximately 3 megacycles would be required, well within state-of-the art component operation.

Returning now to FIGURE 1, the sequences $\underline{U}_{mr}$ and $\underline{U}_{mi}$ derived by arithmetic unit 18 are applied to conventional digital-to-analog converters 27 and 29, respectively, via paths 23 and 24, for conversion to analog signals. The resulting analog signals are fed through leads 31 and 33 to a pair of low-pass filters 36 and 38, preferably arranged to pass only those frequencies lower than $W/2$ with little or no attenuation. The outputs of the two filters may therefore be expressed mathematically as follows:

$$\underline{U}_r(t) = \sum_{k=1}^{N} [u_{kr} \cos 2\pi(\alpha_k - \tfrac{1}{2})Wt - u_{ki} \sin 2\pi(\alpha_k - \tfrac{1}{2})Wt]$$

$$\underline{U}_i(t) = \sum_{k=1}^{N} [u_{kr} \sin 2\pi(\alpha_k - \tfrac{1}{2})Wt + u_{ki} \cos 2\pi(\alpha_k - \tfrac{1}{2})Wt] \quad (8)$$

We have assumed that $0 < \alpha_k < 1$ for all values of $k$. It will readily be observed, by substituting $(pN+m)/W$ for $t$ in these expressions that sampled values of $\underline{U}_r(t)$ and $\underline{U}_i(t)$ at intervals of $1/W$ are identical to the values of $\underline{U}_{mr}$ and $\underline{U}_{mi}$ given by expressions (7), respectively.

The signals $\underline{U}_r(t)$ and $\underline{U}_i(t)$ emanating from the low pass filters are each composed of frequencies between 0 and $W/2$. A signal $S(t)$ composed of frequencies between 0 and W may be generated by suitably modulating $\underline{U}_r(t)$ and $\underline{U}_i(t)$ and combining the resultant signals. To this end, a $$\sin 2\pi \frac{W}{2} t$$

wave is applied from a conventional oscillator 45 via path 43 as an input to balanced modulator 60, to which the signal $\underline{U}_r(t)$ is applied as the other input at 40. Similarly, a $$\cos 2\pi \frac{W}{2} t$$

wave, in phase quadrature relationship with the sine wave, is applied from oscillator 47 through path 44 to balanced modulator 61, the $\underline{U}_i(t)$ signal at 42 being applied as a second input to the latter modulator. The respective output signals of the two balanced modulators at 48, 49 are combined in a suitable signal combiner 53 to provide the desired output signal S(*t*) for application to a transmitter via channel 56:

$$S(t)=\sum_{k=1}^{N}[u_{kr} \sin 2\pi\alpha_k Wt + u_{ki} \cos 2\pi\alpha_k Wt] \quad (9)$$

The signal S(*t*) consists of sine and cosine waves having amplitudes given by the values $u_{kr}$ and $u_{ki}$ respectively and with frequencies given by $\alpha_k W$. If, for example, we make $M_k$ (in the expression for $\alpha_k$) equal to N for all values of *k*, then $\alpha_k = k/N$ and $$S(t)=\sum_{k=1}^{N}\left[u_{kr} \sin 2\pi k \frac{W}{N} t + u_{ki} \cos 2\pi k \frac{W}{N} t\right] \quad (10)$$

which corresponds to expression (1). The frequencies of the N sine and cosine components can be made equal to any values between 0 and W by properly selecting the values for $M_k$.

It should be noted that the calculation of $$\epsilon_{N-k+1}^{pN+m}$$

in FIGURES 7*a* and 8 cannot continue indefinitely without excessive degradation in accuracy. To limit the degradation to an acceptable level, it is desirable that $$\epsilon_{N-k+1}^{pN+m}$$

repeat after a certain number of frames and slots; i.e.

$$\epsilon_{N-k+1}^{PN+M} = \epsilon_{N-k+1}$$

for all values of *k* where P and M are particular values of *p* and *m*. Under these circumstances $$\epsilon_{N-k+1}^{pN+m}$$

would be equal to $\epsilon_{N-k+1}$ in the first slot of the zeroth frame and every P frames and M slots thereafter. At these particular times, the operation described previously would be modified and, rather than calculate $$\epsilon_{N-k+1}^{pN+m} \text{ from } \epsilon_{N-k+1}^{pN+m-1}$$

and $\epsilon_{N-k+1}$, $\epsilon_{N-k+1}$ would be transferred directly from storage to $$\epsilon_{N-k+1}^{pN+m}$$

storage.

An embodiment exemplifying suitable apparatus for use at the receiving terminal of the data modem according to the present invention is shown in block diagrammatic form in FIGURE 9. It will be observed that this apparatus generally comprises the inverse of that shown in FIGURE 1, except for the presence of decision unit 230 to be described presently. The arrangement of balanced modulators 200 and 202, each having a pair of inputs constituting the received signal S(*t*)* (where the single asterisk symbolizes a signal corrupted by noise) and respective sine and cosine waves applied at 207 and 209, the low-pass filters 214 and 216, each having an upper cut-off frequency of *W*/2 c.p.s., and the analog-to-digital converters 220 and 222, performs an operation inverse to that performed by the corresponding elements at the transmitting terminal.

Hence, the output sequences $$\underline{U}_{nr}^{*} \text{ and } \underline{U}_{ni}^{*}$$

are produced by operations which may be viewed as the pre-processing associated with digitizing the received signal.

In order to convert the sequences $$\underline{U}_{nr}^{*} \text{ and } \underline{U}_{ni}^{*}$$

into the sequences $$\underline{u}_{mr}^{*} \text{ and } \underline{u}_{mi}^{*}$$

which correspond to the quantities derived during the operation of the transmitting terminal equipment, the configuration of the arithmetic unit must be changed to that shown in FIGURE 12a. In essence, the arithmetic unit in the demodulator portion or receiving terminal equipment of the data modem performs a finite Fourier analysis by which the band-limited input waveform, or selected quadrature-related sequences representative of samples thereof, is analyzed in terms of its Fourier components, as will become evident from the ensuing description of operation of arithmetic unit 225.

For purposes of illustration it will be assumed for the moment that the input to the demodulator is the modulator output S(*t*)

$$S(t)=\sum_{k=1}^{N}[u_{nr} \sin 2\pi\alpha_n Wt + u_{ni} \cos 2\pi\alpha_n Wt] \quad (11)$$

Referring to FIGURE 9, signal S(*t*) is applied in parallel to a pair of conventional balanced modulators 200 and 202, each of which is operative, in known fashion, to form the product of the signals injected at the two input terminals thereof. To this end, a sine function and a cosine function of frequency *W*/2 are applied respectively from suitable function generators as the second input signal to balanced modulators 200 and 202, the other input, of course, being the signal S(*t*). Hence, the output signal obtained from each modulator under these conditions consists of pairs of sinusoids having sum and difference frequencies $\alpha_n W + W/2$ and $\alpha W - W/2$, respectively.

Low pass filters 214 and 216 to which the product signals of modulators 200, 202 respectively are applied, each have a bandwidth of *W*/2 to reject the sum frequencies, i.e. $(\alpha_n + 1/2)W$ so that the output signals of the two filters are proportional to $\underline{U}_r(t)$ and $\underline{U}_i(t)$, given previously.

Each of these signals is supplied to a separate conventional analog-to-digital converter (A/D) 220, 222, which operates to sample its respective input signals at intervals of time equal to one-half the reciprocal of the frequency of the reference sine and cosine waves, 1/*W* in this case, to thus provide a discrete (quantized) pattern of pulses. Each of the A/D converters is designed to produce a stream of *d*-bit words, where *d* is a number which will depend upon the number of discrete pulse levels desired, in general $b^d$ levels being achievable with a *d*-digit *b*-base number system. The *n*th samples of the *p*th frame $\underline{U}_{nr}$ and $\underline{U}_{ni}$ issuing from the A/D converters 220 and 222 can be obtained by substituting $(pN+n)/W$ for *t* in the expressions for $\underline{U}_r(t)$ and $\underline{U}_i(t)$.

$$\underline{U}_{nr}=\sum_{q=1}^{N}\{u_{qr} \cos [2\pi(pN+n)(\alpha_q - 1/2)] - u_{qi} \sin [2\pi(pN+n)(\alpha_q - 1/2)]\}$$

$$\underline{U}_{ni}=\sum_{q=1}^{N}\{u_{qr} \sin [2\pi(pN+n)(\alpha_q - 1/2)] + u_{qi} \cos [2\pi(pN+n)(\alpha_q - 1/2)]\} \quad (12)$$

The amplitudes $u_{qr}$ and $u_{qi}$ of the sine and cosine components of the input signal S(*t*) are determined from the quantities $\underline{U}_{nr}$ and $\underline{U}_{ni}$ by means of the arithmetic unit 225. In discussing its operation, concurrent references will be made to FIGURES 12a and 12b, the former figure showing, in block diagrammatic form, an exemplary arithmetic unit where, for purposes of clarity and convenience, the two input words streams $\underline{U}_{nr}$ and $\underline{U}_{ni}$ are represented by a single complex word stream $\underline{U}_n$ where $$\underline{U}_n = \underline{U}_{nr} + j\underline{U}_{ni} \quad (13)$$

and the latter figure providing a tabular representation of the operational sequence of the unit for $N=4$. While complex number notation is employed in the discussion of the two figures for reasons of simplicity, an embodiment of the arithmetic unit suitable for processing the original real-word streams $\underline{U}_{nr}$ and $\underline{U}_{ni}$ will be described presently. In any event, it will be clear that the input to arithmetic unit 225 constitutes digital sequences representative of amplitude samples of phase quadrature related versions of the input waveform, these sequences thereby representing orthogonal pairs of samples of the input waveform (or of that waveform and a quadrature-shifted version thereof) conforming to a Fourier series representation. The arithmetic unit is capable of processing these sequences to derive quadrature-related coefficients of the amplitude spectrum of the waveform. The frequency of each amplitude-representative sample is translated or shifted to a new frequency according to a predetermined frequency separation between the spectral lines, by combining the sequences with stored or generated functions of frequency, as will presently be explained.

Substituting the expressions (12) for $\underline{U}_{nr}$ and $\underline{U}_{ni}$ in the equation above:

$$\underline{U}_n = \sum_{q=1}^{N} u_q \exp\left[j2\pi(pN+n)(\alpha_q - \tfrac{1}{2})\right] \quad (14)$$

where $$u_q = u_{qr} + ju_{qi}$$

and where use has been made of the fundamental identity $$e^{jwt} = \cos wt + j \sin wt$$

The complex word stream $\underline{U}_n$ is applied as an input to a multiplier 320 wherein the sign of the odd numbered samples is changed by feeding a $(-1)^{pN+n}$ signal from any suitable function generator to the second input of the multiplier at intervals corresponding to the sampling period. Hence, with the output of multiplier 320 denoted by $U_n$ the product obtained is $$U_n = (-1)^{pN+n}\underline{U}_n \quad (15)$$

or what is the same thing $$U_n = \exp\left(j2\pi\frac{pN+n}{2}\right)\underline{U}_n \quad (16)$$

since $$(-1)^{(pN+n)} = \exp\left[j\pi(pN+n)\right] = \exp\left(j2\pi\frac{pN+n}{2}\right)$$

Substituting the expression for $\underline{U}_n$ given previously in the expression above $$U_n = \sum_{l=1}^{N} u_l \exp\left[j2\pi(pN+n)\alpha_l\right] \quad (17)$$

The words thus derived are divided into frames of data each containing N words, the frame period being equal to $N/W$. A frame of data is read into memory unit 322 during one frame period while simultaneously therewith the data read into the memory during the previous frame period is repetitively read out in reverse order at a rate somewhat higher than N times the input rate. Memory 322 may comprise a conventional magnetic or non-magnetic storage unit whose capacity is sufficient to store the 2N complex words constituting two frames of data. Since random access storage is not required, i.e. storage in which the location of items of stored information may be selected for read out of contents in random fashion with equal facility of access to each selected location, memory 322 may comprise simply an "input-output" unit rather than an "addressable" unit.

To provide the desired filter characteristic for a particular application of the present invention, the data read out of the memory is applied to a multiplier 325 for multiplication by a "weighting function" $w_m(N-k)$ generated by a control unit (i.e. a conventional function generator, not shown) and applied to the other input terminal of the multiplier 325. The output of multiplier 325 is added to the output of a further multiplier 329, via switch 330, by adder 332, all of conventional type.

Multiplier 329 is provided with one input, via switch 334, from a one-position delay unit 335 which is coupled, in parallel with gate 337, to the output terminal of adder 332. The other input data applied to multiplier 329 in positions 1 through $(N-1)$ is the product $$(\epsilon_1\epsilon_2\epsilon_3 \ldots \epsilon_m)^{-1}$$

and in position N is the product $(\epsilon_1\epsilon_2\epsilon_3 \ldots \epsilon_m)^{-pN-1}$. These quantities are complex numbers which are functions of the slot number $m$ and the frame number $p$ and are obtained from the two storage units, generally designated 338. Storage units 338 may, like memory 122, comprise an "input-output" magnetic or non-magnetic data storage medium. A suitable embodiment of one-position delay unit 335, for example, is a delay line whose delay time is equal to a position interval, or a one-stage shift register responsive to shift pulses corresponding to position sync pulses so that the output of the register is at all times the data word occupying the immediately preceding position. Gate 337 may comprise an AND gate to which slot sync pulses are applied to sequentially gate the output of the adder 332 as an output of the arithmetic unit for each succeeding slot interval.

For convenience as well as simplicity and clarity in describing the operation of the arithmetic unit, the particularly simple situation is chosen for illustration in FIGURE 12*b* in which $N=4$. The memory 322 output is added to the output of multiplier 329 (which is zero at the start of a frame period), delayed by one position, multiplied by $(\epsilon_1\epsilon_2 \ldots \epsilon_m)^{-1}$, and added to the output of memory 322. The process is repeated until the Nth position is reached whereupon $(\epsilon_1\epsilon_2 \ldots \epsilon_m)^{-pN-1}$ replaces $(\epsilon_1\epsilon_2 \ldots \epsilon_m)^{-1}$ as the multiplicand. It is evident from FIGURE 12*b* that the contents $u_m$ of the adder at the Nth position of the *m*th slot of the *p*th frame is given by $$u'_m = \sum_{k=1}^{N} w_{mk}U_k(\epsilon_1\epsilon_2 \ldots \epsilon_m)^{-pN-k}$$

or $$u'_m = \sum_{k=1}^{N} w_{mk}U_k \exp\left[-j2\pi(pN+k)\alpha_m\right] \quad (18)$$

The output from the arithmetic unit has been denoted by primed symbols to avoid confusion with the unprimed symbols used to denote the inputs to the modulator arithmetic unit. Ultimately, $w_{mk}$ and $\alpha_m$ will be defined in such a way that in the absence of noise the primed and the unprimed symbols are equivalent. This quantity is passed through the gate at the conclusion of the Nth position by the action of a slot sync pulse. The timing remaining in a slot period is devoted to calculating the value of $(\epsilon_1\epsilon_2 \ldots \epsilon_m)^{-(p+1)N-1}$ which is required in the next frame. The new value replaces the value $$(\epsilon_1\epsilon_2 \ldots \epsilon_m)^{-pN-1}$$

held in storage which is no longer needed. The calculation of $(\epsilon_1\epsilon_2 \ldots \epsilon_m)^{-(p+1)N-1}$ from $(\epsilon_1\epsilon_2 \ldots \epsilon_m)^{-pN-1}$ and $(\epsilon_1\epsilon_2 \ldots \epsilon_m)^{-N}$ cannot continue indefinitely without excessive degradation in accuracy. Since it was arranged in the modulator to have $$\epsilon_k^{pN+m} = \epsilon_k \; (k=1,2 \ldots N)$$

for $p$ and $m$ equal to certain numbers P and M respectively, $$\epsilon_k^{PN+M}=\epsilon_k$$

and $$(\epsilon_k^{PN+M})^N=\epsilon_k^N$$

$$\epsilon_k^{-N+1}(\epsilon_k^{PN+M})^N=\epsilon_k$$

$$\epsilon_k^{(PN+M-1)N+1}=_k$$

Consequently, $$(\epsilon_1\epsilon_2 \ldots \epsilon_m)^{-(PN+M-1)N-1}=(\epsilon_1\epsilon_2 \ldots \epsilon_m)^{-1}$$

Thus the value of $(\epsilon_1\epsilon_2 \ldots \epsilon_m)^{-pN-1}$ is equal to $(\epsilon_1\epsilon_2 \ldots \epsilon_m)^{-1}$ in the zero-th frame and every $$(PN+M-1)\text{th}$$

frame thereafter. At these particular times, the operation described previously would be modified and rather than calculate $(\epsilon_1\epsilon_2 \ldots \epsilon_m)^{-(p+1)N-1}$ from the value for the previous frame, $(\epsilon_1\epsilon_2 \ldots \epsilon_m)^{-1}$ would be transferred directly from storage to $(\epsilon_1\epsilon_2 \ldots \epsilon_m)^{-pN-1}$ storage.

Substituting the expression for $U_{k'}$ (from expression (17) with $k$ substituted for $n$) i.e., $$U_k=\sum_{l=1}^{N} u_l \exp\,[j2\pi(pN+k)a_l]$$

in expression (18) above there is obtained $$u'_m=\sum_{l=1}^{N} u_l \sum_{l=1}^{N} w_{mk} \exp\,[j2\pi(pN+k)(a_l-a_m)]$$

If $w_{mk}$ and $\alpha_m$ are chosen such that $$\sum_{k=1}^{N} w_{mk} \exp\,[j2\pi(pN+k)(a_l-a_m)]=\begin{cases}1 & l=m\\ 0 & l\neq m\end{cases}$$

then $$u'_m=u_m$$

and the desired demodulation process has been accomplished. It should be apparent from the preceding description of operation of the arithmetic unit and from the above expressions, that output data $u_m$ contains sine and cosine coefficients of the amplitude spectrum of the waveform under consideration. These are derived by processing the digital amplitude-representative samples of the waveform such that the samples are combined with sine and cosine functions of frequency selected in accordance with slot number and position within slot( see, e.g. the table of FIGURE 12*b*), and hence with spectral line index associated with that slot, and the combinations summed with successive digital samples issuing from the memory (as indicated by the several circulations of data tabulated in FIGURE 12*b* for the specific example described). The input to the modulator arithmetic unit is identical to the output from the demodulator arithmetic unit. In terms of the original example the desired result would be achieved if $w_{mk}$ is equal to $1/N$ for all values of $m$ and $k$ and $M_m$ equals N for all values of $m$. Then $$\frac{1}{N}\sum_{k=1}^{N} \exp\left[j2\pi\frac{(pN+k)(l-m)}{N}\right]=\begin{cases}1 & l=m\\ 0 & l\neq m\end{cases}$$

The operation in terms of real number inputs is shown in FIGURE 13. If $$\underline{U}_n=\underline{U}_{nr}+j\underline{U}_{ni}$$

then $$u_m=u_{mr}+ju_{mi}$$

It is believed that operation and structure of the arithmetic unit 225 are sufficiently set forth in FIGURE 12*a*, and, that by analogy to the arithmetic unit of the modulator (see FIGURES 7*a* and 8) the structure and operation of the unit of FIGURE 13 will be readily apparent without further detailed discussion.

Since the received signal $S^*(t)$ is a noise-corrupted version of the transmitted signal $S(t)$, the outputs $u^*_{mr}$ and $u^*_{mi}$ of arithmetic unit 225 are also corrupted. It is therefore necessary to provide apparatus by which to reconstruct, as nearly as possible, the original sequences $u_{mr}$ and $u_{mi}$. This is the function of decision unit 230, no corresponding apparatus having been required at the transmitting terminal of the data modem.

An illustrative embodiment of decision unit 230 is shown in block diagrammatic form in FIGURE 10*a*, with transfer rules for the operation of the unit shown in FIGURE 10*b*. To provide the decision unit with the capability of handling any of the several types of modulation previously discussed, the dual inputs $u^*_{mr}$ and $u^*_{mi}$ are added to appropriate comparison levels in respective adders 250 and 252. A set of four comparison levels, for use respectively with On-Off, 2-level PSK, FSK, and 4-level PSK types of modulation, is shown in FIGURE 10*b*. Depending upon the sign of the contents of each adder for each input word, either a transfer operation is performed on stored unit-amplitude numbers in storage elements 256 and 258, respectively, or no transfer operation is effected. For example, where On-Off modulation has been employed, a positive value for the contents of either adder will produce a transfer of the stored "1" as an output from its associated storage, while a negative value inhibits such a transfer. In this manner, the reconstructed outputs $$u^{}_{mr} \text{ and } u^{}_{mi}$$

are provided from decision unit 230. Other transfer rules for the other types of modulation are indicated in FIGURE 10*b*. The described decision process has been found to be optimum for the detection of signals in a white noise background.

The reconstruction sequences $$u^{}_{mr} \textit{ and } u^{}_{mi}$$

are applied to format converter 235 (FIGURE 9) which performs the operation inverse to that performed by format converter 12 at the transmitting terminal. That is, format converter 235 functions to convert the time-division format derived by arithmetic unit 225 from the received frequency-division signal, and extracted from the noise by decision unit 230, into a serial binary stream of data identical to the original input data.

An embodiment of a format converter suitable for use in the receiving terminal equipment to obtain this result is shown in block diagrammatic form in FIGURE 11. The time-division sequence arriving from the decision unit is fed into a gate 240 which is opened during the period extending from the 8th to the 39th slots of each frame by simultaneous application of an appropriate read-in signal thereto, in a manner similar to that described above with respect to operation of the format converter at the transmitting terminal. Thereby, the output of the decision unit over the specified time slots fills 32-bit shift register 243 in the case of On-Off and 2-level PSK modes, and half fills shift register 243 (i.e. only storage elements 17–32) in the case of the FSK mode. At the end of each frame period, the contents of shift register 243 are transferred in parallel to 32-bit shift register 247 by application of a frame sync pulse. The contents of shift register 247 are then shifted out toward the right, during the next successive frame, through storage element 1 at a rate of 2400 bits/second for the On-Off and 2-level PSK modes, and through storage elements 17 at a rate of 1200 b.p.s. for the FSK mode. An additional circuit 260, enclosed in dotted lines in the lower half of FIGURE 10, is used for the conversion of a 4-level PSK mode in a manner analogous to that described for format converter 12. As will readily be observed, circuit 260 is identical to the circuitry utilized for 2-level PSK conversion in the upper half of the figure.

The serial binary stream taken from the appropriate data output is now ready for storage or analysis by conventional equipment at the receiving terminal.

Synchronization of the modulator and demodulator portions of the modem may be accomplished by any convenient and conventional technique, any number of which are presently available in the art.

While I have described and illustrated a specific embodiment of my invention, it will be apparent that various changes and modifications of the specific details of construction and operation set forth may be resorted to without departing from the spirit and scope of the invention. It is therefore desired that the present invention be limited only by the appended claims.

I claim:

1. Apparatus for generating band-limited signals, comprising means for converting an input digital data stream conveying information to be carried by said signals to digital sequences of amplitude values of sine and cosine components of the output signals to be generated, means responsive to said digital sequences for transformation thereof to sequences representative of amplitude samples of the in-phase and quadrature components of the output signals to be generated, and means for converting the amplitude sample-representative sequences to analog band-limited output signals.

2. The combination according to claim 1 wherein said means for transforming includes means for storing the digital amplitude values, and means for periodically computing samples of amplitude of the composite output signal from the stored digital amplitude values.

3. The combination according to claim 1 wherein said digital sequences of amplitude values of sine and cosine components are encoded in a time-division format by the first-mentioned means for converting, and wherein said means for transforming is operative to produce amplitude sample sequences in a frequency-division format.

4. Apparatus for generating a plurality of tones simultaneosuly within a preselected frequency band, comprising means for storing digital values representative of tone frenquencies, means for periodically computing samples of the amplitude of the composite waveform to be generated by said apparatus from the stored digital values, and means for converting the amplitude samples to an analog waveform representative of said plurality of tones.

5. Apparatus for generating a plurality of tones simultaneously within a prescribed band of frequencies in the form of an analog waveform, comprising means for converting an input digital data stream carrying information to be conveyed by said tones to sequences of digital values representative of the amplitude values of sine and cosine components of each tone, means for converting said amplitude representative sequences into further sequences representative of the amplitudes of the in-phase component and the quadrature component of the analog waveform to be generated, and means for converting the last-named sequences to said analog waveform.

6. The combination according to claim 5 wherein said means for converting the amplitude representative sequences into further sequences includes means for storing digital values representative of tone frequencies, and means for computing periodically from the stored digital values samples of the composite analog waveform.

7. The combination according to claim 5 wherein said means for converting the input digital data stream to sequences of digital values includes means for formulating said digital values in any of a plurality of selectable transmission modes, and means for generating the digital values in sequences in the selected transmission mode at any of a plurality of selectable data rates.

8. The combination according to claim 7 wherein said means for converting the amplitude representative sequences into further sequences comprises means responsive to said amplitude representative sequences and operative independent of the mode in which the sequences are formulated to generate said further sequences representative of the amplitudes of the in-phase component and quadrature component of said analog waveform in a mode corresponding to said selected transmission mode.

9. The combination according to claim 5 wherein said sequences of digital values representative of sine and cosine components are encoded in a time-division configuration and wherein said sequences representative of the amplitudes of in-phase component and quadrature component are encoded in a frequency-division configuration.

10. A data modem for use at the transmitting and receiving stations of an information transmission system, said modem comprising, at said transmitting station, means responsive to input information for modulation thereof in a time-division format, means for digitally processing said time-division format in a sequential fashion to convert said time-division format to a sequential digital frequency-division format, and means for converting said sequential digital frequency-division format to an analog signal having a frequency-division multiplexed configuration; and, at said receiving station, means responsive to the received frequency-division multiplex signal for deriving therefrom a digital sequential frequency-division format containing the transmitted information, means for converting the last-named frequency-division format to a digital sequential time-division format, and means for detecting the original input information from the last-named time-division format.

11. The combination according to claim 10 wherein is included, at said receiving station, means for extracting the digital time-division format produed by the last-named convertng means from any noise background thereon.

12. Apparatus for generating band-limited signals from information conveyed by an input digital data stream, comprising means responsive to said input digital data stream for conversion thereof to separate parallel streams of digital data words in which said parallel streams have a phase quadrature relationship and each is divided into sequential frames in a time-division format, each frame containing a sequence of digital data words, each of said words occupying a separate and distinct time slot in the frame, and means for processing each time-division frame of data to produce a composite output signal consisting of phase quadrature related analog waveforms in a frequency division format, the amplitudes of said waveform for a plurality of sequentially translated frequency channels of said frequency-division format being governed by respective values of the data words of said parallel streams for a corresponding frame.

13. The invention according to claim 12 wherein said means for conversion comprises means for selectively formulating said digital data words in one of a plurality of transmission modes.

14. The invention according to claim 13 where said means for conversion further comprises means for generating the digital data words in frame sequences in the selected transmission mode at one of a plurality of selectable transmission rates.

15. In a system for producing band-limited signals to convey information carried by an input digital data stream, means responsive to said input data stream for selective and sequential encoding thereof into a pair of phase quadrature related digital waveforms in a time division format, said format comprising frames of digital data in which sequential time intervals of each frame are occupied by pieces of data for governing the amplitudes of signal components of the band-limited signal to be produced by asid system;

means responsive to said pair of phase quadrature related digital waveforms in time division format for sequential digital conversion thereof to a pair of respective sequential streams of digital data in phase quadrature relationship and frequenty-division format, wherein the parameters of the frequency channels of said frequency-division format are controlled by the data occupying respectively related sequential time intervals of said frames of said time division format;

a pair of separate parallel processing channels respectively responsive to said pair of sequential streams of digital data, each of said channels including means for converting each frame of digital data to analog signal of related characteristics, means for passing said analog signal of frequencies below a predetermined frequency limit related to the data rate of the digital waveforms in said time division format, and means for modulating that portion of each said analog signal transmitted by said signal passing means with a signal frequency constituting a function of said data rate; and means for combining the output signals simultaneously emanating from both of said parallel channels to generate said band-limited signals.

16. The invention according to claim 15 wherein said means for selectively encoding includes means for controlling the number and spacing of frequency channels to be provided in said frequency division format, and means for selecting the type of modulation to be associated with each frequency channel.

References Cited

UNITED STATES PATENTS

| | | |
|---|---|---|
| 3,218,559 | 11/1965 | Applebaum. |
| 3,257,511 | 6/1966 | Adler. |
| 3,328,528 | 6/1967 | Darlington. |

ROBERT L. GRIFFIN, *Primary Examiner.*

W. S. FROMMER, *Assistant Examiner.*

U.S. Cl. X.R.

178—50